United States Patent [19]

Blank et al.

[11] Patent Number: 5,448,059
[45] Date of Patent: Sep. 5, 1995

[54] OPTICAL TIME DOMAIN RELECTOMETRY WITH OPTICAL AMPLIFIER FOR EXTENDED RANGE AND/OR SENSITIVITY

[75] Inventors: Lutz C. Blank, Colchester; David M. Spirit, Woodbridge, both of England

[73] Assignee: British Telecommunications public limited company, London, England

[21] Appl. No.: 541,973

[22] Filed: Jun. 22, 1990

[30] Foreign Application Priority Data

Jun. 22, 1989 [GB] United Kingdom .................. 8914364
Jul. 1, 1989 [GB] United Kingdom .................. 8915165

[51] Int. Cl.$^6$ ................................................ H01J 5/16
[52] U.S. Cl. .............................. 250/227.21; 256/73.1; 250/227.14
[58] Field of Search .................. 356/73.1; 250/227.12, 250/227.21, 227.14, 227.15, 227.16; 385/12, 13

[56] References Cited

U.S. PATENT DOCUMENTS 5,013,907 5/1991 Bateman .............................. 356/73.1

FOREIGN PATENT DOCUMENTS 0186299 7/1986 European Pat. Off. .
1-142435 6/1989 Japan ................................. 356/73.1
2175766 12/1986 United Kingdom .
2182222 5/1987 United Kingdom .

OTHER PUBLICATIONS

Long Range OTDR for Single-Mode Optical Fibre Using A $P_2O_3$ Highly Doped Fibre Raman Laser, K. Suzuki et al., Electronics Letters, Nov. 20, 1986, vol. 22, No. 24 pp. 1273–1274.
An Optical Time-Domain Reflectometer for Long 1.5-μm Band Optical Fiber Cables, K. Noguchi et al., Review of the Electrical Communications Lab., vol. 35, No. 5 1987 pp. 541–545.
1.5-μm Band Optical Time Domain Reflectometer for Single-Mode Optical Fiber Using a $P_2O_5$-Highly-Doped Fiber Raman Laser, K. Suzuki et al., Journal of Lightwave Technology, vol. 6, No. 1, Jan. 1988. pp. 94–99.
Fiber Optic Trends, Fiber Lasers: New Interest in an Old Technology, Chris Emslie, Photonics Spectra, Apr. 1989, pp. 103, 104, 106, 108.
250 km Nonrepeated transmission experiment at 1.8 Gb/s Using LD pumped $Er^{3+}$-doped Fibre Amplifiers in IM/direct Detection System, K. Hagimoto et al., Electronics Letters, May 11, 1989, vol. 25, No. 10, pp. 662–664.
$Er^{3+}$-doped Fibre Amplifiers in IM/direct Detection System, K. Hagimoto et al., Electronics Letters, May 11, 1989, vol. 25, No. 10, pp. 662–664.
Blank et al, "Optical Time Domain Reflectometry on Optical Amplifier Systems", Journal Of Lightwave Technology, vol. 7, No. 10, Oct. 1989.
Suzuki et al, "Long-Range OTDR For Single-Mode Optical Fiber Using A $P_2O_5$ Highly Doped Fibre Raman Laser", Electronics Letters, 20 Nov. 1986, vol. 22, No. 24, pp. 1273–1274.
Noguchi et al, "An Optical Time-Domain Reflectometer for Long 1.5-μm Band Optical Fiber Cables", Review of the Electrical Communications Laboratories, vol. 35, No. 5, 1987, pp. 541–545.
Suzuki et al, "1.5 μm-Band Optical Time Domain Reflectometer for Single-Mode Optical Fiber Using a $P_2O_5$-Highly-Doped Fiber Raman Laser", Journalof Lightwave Technology, vol. 6, No. 1, Jan. 1988, pp. 94–99.
Spirit et al, "Raman-Assisted Long-Distance Optical Time Domain Reflectometry", Elec. Ltrs. vol. 25, No. 25, 7 Dec. 1989, pp. 1687–1688.
Blank et al, "OTDR Performance Enhancement Through Erbium Fibre Amplification", Elec. Ltrs. vol. 25, No. 25, 7 Dec. 1989, pp. 1693–1694.
Tamura et al, "Fiber Raman Amplifier Module with Semiconductor Laser Pump Source", ECOC 87 Technical Digest, vol. 1, pp. 62–65.

*Primary Examiner*—Edward P. Westin
*Assistant Examiner*—John R. Lee
*Attorney, Agent, or Firm*—Nixon & Vanderhye

[57] ABSTRACT

Apparatus and a method for increasing the optical measurement range in optical time domain reflectometers in which a fibre laser amplifier is used to amplify the optical time domain reflectometer pulses launched into a waveguide. This apparatus and method have particular usefulness for branched local networks. The signal returning to the optical time domain reflectometer is amplified as well as the outbound signal.

39 Claims, 3 Drawing Sheets

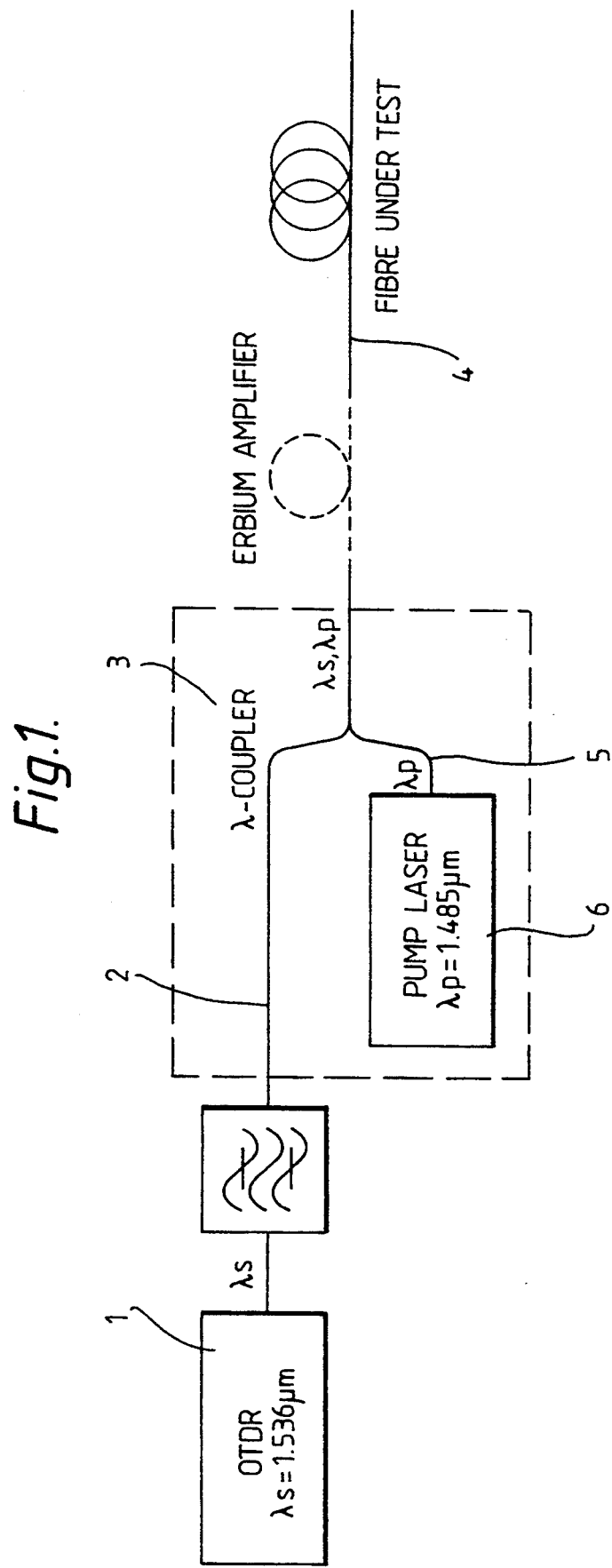

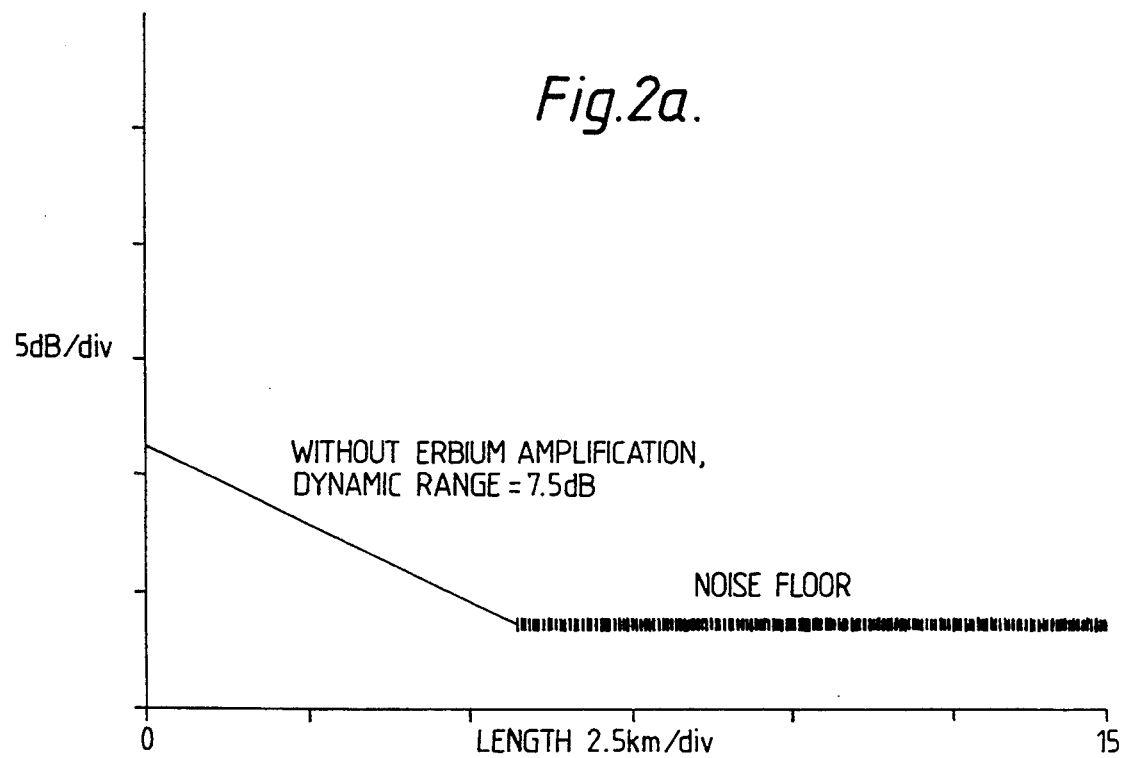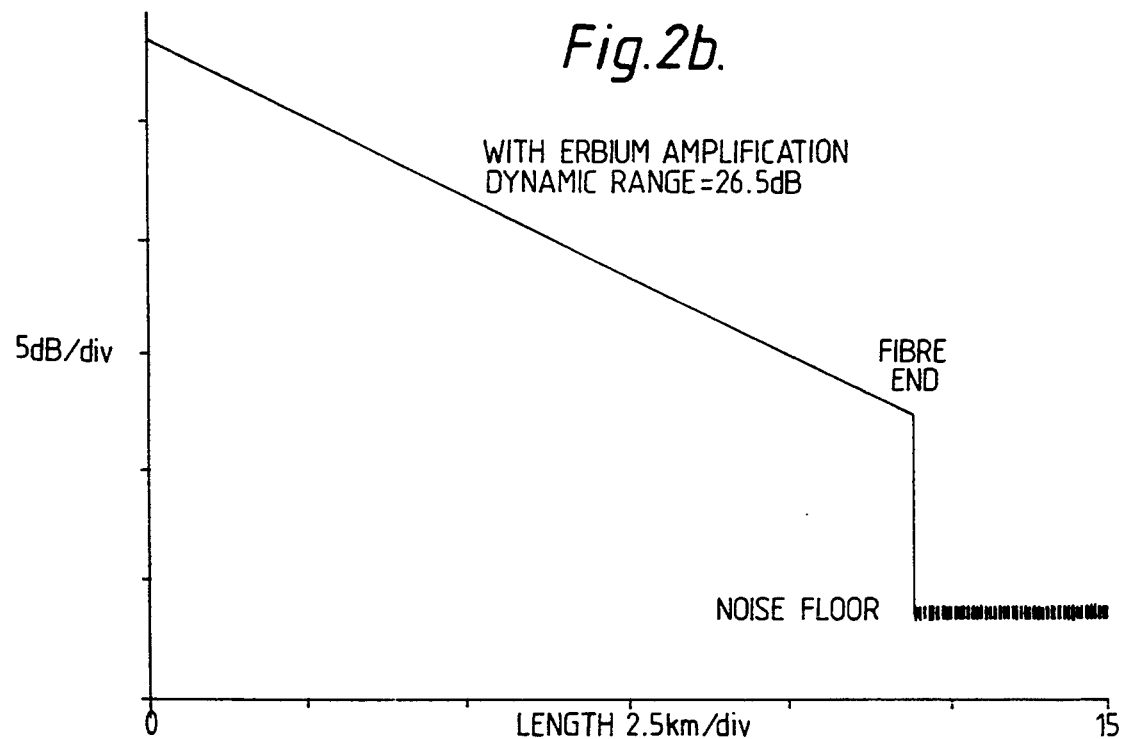

OPTICAL TIME DOMAIN RELECTOMETRY WITH OPTICAL AMPLIFIER FOR EXTENDED RANGE AND/OR SENSITIVITY

This invention relates to Optical Time Domain Reflectometry (OTDR), and especially to enhancing the dynamic range of OTDR equipment.

In OTDR an optical pulse is launched into an optical fibre (or more generally into a waveguide; in this specification the expression 'fibre' is used to include the more general case of a waveguide as well as optical fibres) and backscattered signal returning to the launch end is monitored. In the event that there are discontinuities such as faults or splices in the fibre, the amount of backscattering generally increases and this change is detected in the monitored return signal. Backscattering and reflection also occur from elements such as couplers and so the monitored signal is usually compared with a reference record, new peaks and other changes in the monitored signal level or plot being indicative of changes in the fibre path, normally indicating a fault. The time between pulse launch and receipt of the backscattered pulse is proportional to the distance along the fibre to the source of the backscattering, and so OTDR is a useful technique for fault location. However there are presently distance limitations on how far it is possible to see along a fibre. One of the limitations is the dynamic range of the OTDR receiver which has to be sufficiently sensitive to detect the low level of backscattered light returning from the more distant Dart of the fibre, but also capable of receiving, without damage, much greater intensity reflection and backscattering from fibre locations close to the launch end. In practice OTDR receivers have about a 30 dB optical one-way measurement range, that is a 60 dB optical dynamic range, and this requires the electronics to have a twofold dynamic range of 120 dB resulting from the optical to electrical conversion.

It is desirable to be able to detect faults along fibre of a length exceeding that equivalent to 30 dB, there already being lengths equivalent to 40 dB in existence and further increases being probable. At present it is necessary to utilise OTDR measurements from both ends of a 40 dB span in order to test the full span, and this arrangement is not always convenient, and in any event requires more time and movement of, or additional, equipment.

Additionally, in branched networks, where fibre spans are usually shorter but where there is much effective loss of power resulting from splitting or distribution of signals, short duration pulses are required for high resolution. The necessary short duration pulses contain little power and this, rather than receiver electrical dynamic range limits the effective range of the OTDR in such circumstances it would be useful if significantly higher pulse powers could be achieved, without increasing pulse width and hence losing resolution.

Because OTDR equipment (optical time domain reflectometers) needs to be portable and hence relatively compact, the optical sources chosen for use in such equipment are almost invariably semiconductor laser diodes. The optical source in an OTDR needs to be capable of providing short-duration, well-defined optical pulses if the OTDR is to provide satisfactory resolution. Moreover, satisfactory resolution requires the use of a narrow linewidth source, since the dispersion properties of commonly used optical fibres result in pulse spreading if other than narrow linewidth sources are used. Unfortunately, narrow linewidth semiconductor diode lasers naturally have very limited power outputs.

Thus it is not feasible to increase the useful range of an OTDR simply by replacing the source laser with a higher power semiconductor diode. For experimental purposes, however, bulky and expensive non-semiconductor lasers have occasionally been used as sources in OTDR experiments. The bulk of the replacement laser sources precluding them from fitment within the reflectometer itself.

Increases in OTDR range have in general come about from continual and gradual improvements to the signal processing, software, electronics, and the laser diodes.

So far it has not been thought to be feasible to amplify optically the pulses output from the OTDR source in part this is perhaps due to a perception that the recovery times of laser amplifiers, and in particular semiconductor laser amplifiers, are too short to be useful with pulse lengths in the range normally used in OTDR reflectometry. Other perceived problems or disadvantages have been complexity, polarisation sensitivity, excess spontaneous and stimulated noise, and relatively low gains.

Thus it is that no-one, as far as we are aware, has reported an OTDR or OTDR system in which an optical amplifier is used to amplify pulses from the source for launching into a fibre under test.

According to a first aspect the present invention provides an optical time domain reflectometer comprising a source of optical pulses, means for launching the optical pulses into a waveguide and means for optically pumping the waveguide to produce gain at the optical pulse wavelength prior to launching the amplified pulses into a waveguide to be tested.

A further aspect of the invention provides a method of increasing the measurement range of an optical time domain reflectometer, the method comprising launching an optical pulse into a waveguide and optically pumping the waveguide to induce gain of the pulse prior to launching the amplified pulses into a waveguide to be tested.

The invention is now described by way of example with reference to the accompanying drawings in which:

FIG. 1 is a schematic diagram of an embodiment of the invention; and

FIGS. 2a and 2b show OTDR traces respectively without and with the invention.

Figure 3:
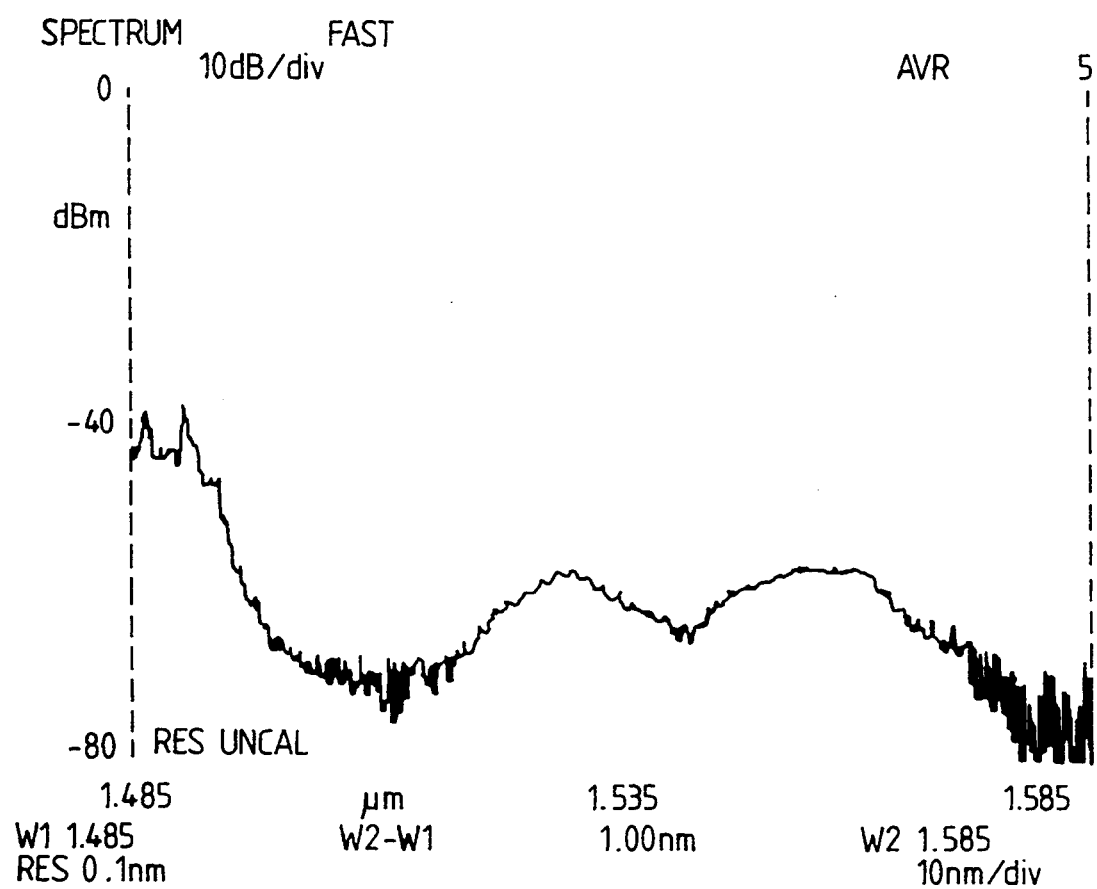
FIG. 3 is a plot of forward spontaneous emission spectrum of an erbium doped fibre amplifier.

Referring firstly to FIG. 1, in a preferred embodiment a modified Hewlett Packard HP8145A OTDR 1 was connected to one input arm 2 of a wavelength division multiplexer (WDM) coupler 3, which was in turn connected to a single-mode fibre under test 4. The Hewlett Packard OTDR was fitted with a suitable narrow-linewidth DFB laser, $\lambda s = 1.536$ micron, in place of the standard non-DFB source. Between the OTDR and the coupler, a 0.8 nm bandwidth bandpass interference filter, with a centre wavelength of 1536 nm, was inserted. The bandwidth was chosen to be narrow enough to reduce the amount of spontaneous amplifier noise reaching the OTDR receiver but sufficiently broad to easily allow the laser emission, which occurs over a few hundred MHz, to pass with low loss. The second input arm 5 of the WDM coupler was connected to a 1485 nm pump laser 6, which could be any suitable laser such as a 1.485 micron semiconductor laser module, for example a GRINSCH MQW laser. For the sake of portability, a semiconductor diode laser is preferred. Suitable pump lasers are available from OKI of Tokyo, Japan, these particular type are of VIPS structure and are supplied in a module with an integral WDM coupling arrangement. The OKI integral coupler serves as coupler 3. Initially the pump power was 65 mW.

An erbium fibre amplifier, to which standard single-mode fibre tails had been attached by fusion splicing, was spliced between the fibre under test 4 and the output arm of the coupler 3. The fibre amplifier consisted of a 10 meter length of small core erbium fibre, having a core diameter of 5.5 $\mu$m, refractive index difference $\Delta n = 0.013$, and a 1100 ppm erbium doping level in the core, further details of which can be found in the paper by Atkins et at, in Electronics Letters, 1989, Vol. 25, pp 910–911, and the references therein. FIG. 3 shows the amplifier forward spontaneous emission spectrum, including the residual pump power at the amplifier output, when pumped with about 65 mW at 1.485 $\mu$m. At a signal wavelength of 1.53 a peak gain of 24 dB was obtained, while at the OTDR wavelength of 1.536 $\mu$m the amplifier gain was 20 dB.

Most preferably, in all embodiments of the invention, amplification of both outbound OTDR pulse and returning backscattered signals occurs in the fibre laser amplifier. Less preferably, there is only amplification of the optical pulses to be launched into the fibre under test, and not of the backscattered signals. Pulsed pump power could be employed, in conjunction with suitable single-pulse OTDR equipment instead of the HP8145A. A Hewlett Packard HP8145A OTDR was selected for the embodiment because it automatically subtracts the mean received light level from the measurements, and thus it is able to cope with residual pump and spontaneous amplifier noise signals that reach the OTDR, other types of OTDRs may be employed if the filtering is adequate.

FIG. 2a is a typical OTDR trace on a 12.4 Km high attenuation test fibre (=1.3 dB/Km) with the power falling to a substantially steady background level given by the OTDR receiver noise floor after about 7 Km. When the pump is turned on the trace modifies to that shown in FIG. 2b so that instead of the trace falling to the noise floor after 7 Km one is able to 'see' the entire fibre length. With the optical amplifier in place, the test fibre was measured in two stages, allowing the use of reduced optical amplifier gain on the initial fibre span, to avoid saturating the OTDR receiver it should be noted that both the outbound and returning signals are amplified rather than just outbound signals, and thus the signals reach and can be detected from further along the fibre than would otherwise be the case.

FIG. 2a and the second measurement of FIG. 2b were obtained with identical settings on the vertical offsets. The measurement noise floor is approximately the same in both cases, thus it can be expected that the erbium fibre gain of 18 dB (20 dB minus 1 dB for each of two fusion splices) should lead to an OTDR range increase of 18 dB one way.

The benefits of the invention may be utilised to aid fault detection in branched networks, where the total span length is less but division of the signal occurs. Branch line identification signals may be superimposed on the returning signals. As mentioned previously, for shorter span branched networks higher OTDR resolution is required and so the OTDR pulses used are narrower and the lower power injection means that a range of 20 dB is the present upper limit. Increasing this to 30 dB utitising fibre amplification is thus of benefit and is within the ability of available electrical dynamic range. The system is preferably not merely used as a power amplifier, the returning signals preferably also pass through the amplifying fibre. A particular advantage of using a fibre amplifier is that pulses of any duration can be amplified, for example from microsecond to picosecond lengths, which is more versatile than amplification provided by semiconductor laser amplifiers which at present cannot provide sufficient power amplification for pulses over 100 picoseconds.

Although pump powers of 65 mW have been used here, lower pump powers of approximately 10 mW can give the same level of amplification, as shown by R. S. Vodhanel et al in Electronic Letters, 1989, Volume 25, page 1386.

For OTDR measurements carried out in the 1500 nm window, erbium is the preferred dopant for the fibre amplifier. High power semiconductor laser pumps are available with wavelengths in the range 1460–1480 nm, for example the previously mentioned GRINSCH MQW lasers. It has been shown by Atkins et al that erbium fibre amplifiers can usefully be operated at wavelengths out to 1580 nm.

For use in the 1300 nm window, neodymium can be used as the dopant for the fibre amplifier with an appropriate pump. Currently the power available fron Nd fibre amplifiers is much lower than that available from erbium fibre amplifiers, but nevertheless it is feasible to obtain usefully increased launched pulse power. Further details on neodymium doped fibre amplifiers can be found in Y. Miyajima et al's paper published in the proceedings of the Optical Fiber Communications (OFC 90) conference held in San Francisco in January 1990.

We claim:

1. An optical time domain reflectometer comprising:
   a source of optical pulses,
   means for launching said optical pulses into a first waveguide, and
   means for optically pumping said first waveguide to produce gain at the optical pulse wavelength prior to launching the amplified pulses into a second waveguide to be tested.

2. An optical time domain reflectometer as in claim 1 in which the optical pulses experience gain when travelling in the outward direction and in the return direction along said first waveguide.

3. An optical time domain reflectometer as in claim 1 or 2 wherein said first waveguide within which said gain occurs is located within the reflectometer.

4. An optical time domain reflectometer as in claim 3 which said first waveguide comprises a fibre having a core diameter in the range 5 to 7 $\mu$m.

5. An optical time domain reflectometer as in claim 4 in which said first waveguide comprises a length of optical fibre doped with a rare-earth element.

6. An optical time domain reflectometer as in claim 5 in which the optical fibre is doped with erbium.

7. An optical time domain reflectometer according to claim 6 in which the pumping power is at least 10 mw.

8. An optical time domain reflectometer according to claim 7 in which the pumping power is at least 65 mW.

9. An optical time domain reflectometer according to claim 8 in which the pumping power is at least 100 mW.

10. An optical time domain reflectometer according to claim 9 in which the means for optically pumping comprises a semiconductor laser.

11. An optical time domain reflectometer according to claim 10 in which the pulse source comprises a semiconductor laser.

12. An optical time domain reflectometer as in claim 11 wherein an optical filter is included in the optical path between the pulse source and said first waveguide in which gain occurs, the filter having a passband of between 0.5 nm and 1.0 nm and a centre wavelength substantially the same as the operating wavelength of the pulse source.

13. An optical time domain reflectometer as in claim 12 wherein the optical pulse source comprises a distributed feedback laser.

14. Amended) A method of increasing the measurement range of an optical time domain reflectometer, the method comprising:
launching an optical pulse into a first waveguide and optically pumping said first waveguide to induce gain of the pulses prior to launching the amplified pulses into a second waveguide to be tested.

15. A method according to claim 14 in which the optical pulses experience gain in the outward direction and the return direction along said first waveguide.

16. A method according to claim 14, wherein said first waveguide within which said gain occurs is located within the reflectometer.

17. A method according to claim 14, 15 or 16, wherein said first waveguide comprises a fibre having a core diameter in the range 5 to 7 microns.

18. A method according to claim 14, 15, 16, wherein said first waveguide comprises a length of optical fibre doped with a rare-earth element.

19. A method according to claim 18 in which the rare-earth element is erbium.

20. A method according to any one of claims 14 to 16 in which the pumping power is at least 10 mW.

21. A method according to any one of claims 14 to 16 in which the pumping power is at least 65 mW.

22. A method according to any one of claims 14 to 16 in which the pumping power is at least 100 mW.

23. A method according to any one of claims 14 to 16 in which the pulse source comprises a semiconductor laser.

24. A method according to any one of claims 14 to 16 in which the means for optically pumping comprises a semiconductor laser.

25. An optical time domain reflectometer comprising:
a source for producting optical pulses,
a receiver for monitoring backscattered light,
a light path joining the pulse source and the receiver to a fibre to be tested,
a fibre amplifier in said light path between the pulse source and the test fibre,
an optical filter in said light path between the receiver and the fibre amplifier, and
means for pumping the fibre amplifier thereby to produce gain at the optical pulse wavelength whereby amplified optical pulses are launched into the test fibre,
wherein the fibre amplifier comprises a length of optical fibre doped with a rare earth element, and
wherein the filter has a pass band which is centered on the operating wavelength of the pulse source.

26. An optical time domain reflectometer as in claim 25 wherein the fibre amplifier is positioned in said light path in such a manner that optical pulses returned by the tested fibre also are amplifier prior to reaching the receiver.

27. An optical time domain reflectometer as in claim 25 or 26 wherein the fibre amplifier is located within the reflectometer.

28. An optical time domain reflectometer as in claim 27 wherein the core diameter of the fibre amplifier lies in the range of from 5 $\mu$m to 7 $\mu$m.

29. An optical time domain reflectometer as in claim 25 wherein the optical fibre of the fibre amplifier is doped with erbium.

30. An optical time domain reflectometer as in claim 29 wherein the pumping means has an output power of at least 10 mW.

31. An optical time domain reflectometer as in claim 30 wherein the pumping means has an output power of at least 65 mW.

32. An optical time domain reflectometer as in claim 31 wherein the pumping means has an output power of at least 100 mW.

33. An optical time domain reflectometer as in claim 25 in which the pumping means comprises a semiconductor laser.

34. An optical domain reflectometer as in claim 25 in which the pulse source comprises a semiconductor laser.

35. An optical time domain reflectometer as in claim 34 wherein the pulse source comprises a distributed feedback laser.

36. An optical time domain reflectometer as in claim 25 wherein the filter has a passband of between 0.5 nm and 1.0 nm.

37. A method of increasing the measurement range of an optical time domain reflectometer comprising:
launching optical pulses into a fibre amplifier located in a light path between a pulse source and a test fibre,
optically pumping the fibre amplifier to amplify the pulses and launching the amplified pulses into the test fibre, and
optically filtering the returned optical pulses prior to said pulses reaching a receiver.

38. A method as in claim 37 further comprising the step of amplifying the returned optical pulses from the tested fibre in the fibre amplifier.

39. An optical time domain testing instrument comprising:
a laser light source,
an optical amplifier,
first optical coupling means for optically coupling the optical amplifier in series between the laser light source and an optical fiber under test,
means for energizing the laser light source to launch a light pulse into the fiber under test,
a photodetector, and
second optical coupling means for optically coupling the optical amplifier to the photodetector.

* * * * *